July 24, 1951 A. V. HAEFF ET AL 2,561,363

PULSE TRANSMISSION SYSTEM

Filed Jan. 16, 1946 3 Sheets-Sheet 1

INVENTORS
ANDREW V. HAEFF
FRANKLIN H. HARRIS
BY
M. O. Hayes
ATTORNEY

July 24, 1951 A. V. HAEFF ET AL 2,561,363

PULSE TRANSMISSION SYSTEM

Filed Jan. 16, 1946 3 Sheets-Sheet 2

INVENTORS
ANDREW V. HAEFF
FRANKLIN H. HARRIS
BY M. O. Hayes
ATTORNEY

INVENTORS
ANDREW V. HAEFF
FRANKLIN H. HARRIS
BY M. O. Hayes
ATTORNEY

Patented July 24, 1951 2,561,363

UNITED STATES PATENT OFFICE 2,561,363

PULSE TRANSMISSION SYSTEM

Andrew V. Haeff, Washington, D. C., and Franklin H. Harris, Accokeek, Md.

Application January 16, 1946, Serial No. 641,548

13 Claims. (Cl. 250—15)

(Granted under the act of March 3, 1883, as amended April 30, 1928; 370 O. G. 757)

This invention relates to devices used to render enermy radio echo object detecting and ranging equipment ineffective.

One of the important special applications of radio echo object detecting and ranging equipment is its use for the control of gun fire. In such applications the radio echo equipment is designed to determine the range and bearing of target objects with greater accuracy than is normally possible with radio echo location equipment intended for detection and search purposes only.

Efforts to render enemy radio echo location equipment ineffective commonly consist of transmitting a suitably modulated interfering signal which either saturates one or more stages of the radio echo location receiver or renders the visual presentation unintelligible. For the latter purpose modulation with a form of random signal containing a broad spectrum of frequencies up to several megacycles, known as noise modulation, has been found most effective.

The interfering signal must be tuned to or approximately to the carrier frequency of the enemy radio echo location equipment. To be effective, the interfering signal must be many decibels larger than the echo signal at the enemy radio echo location receiver. Also, the interfering transmitter should be capable of being modulated with a signal containing relatively high frequencies. These three requisites therefore create the need for an interfering transmitter, tunable over a broad range, capable of modulation up to several megacycles, and capable of delivering a large amount of power spread over its frequency spectrum. If the interfering signal is to be continuous, the design of such a transmitter involves the use of special power tubes which are not readily available.

An alternative method is to transmit the interfering signal in suitably timed pulses. Such a method, described in greater detail in the copending application of Andrew V. Haeff, Serial Number 641,549, filed January 16, 1946, entitled: Pulse Generation System permits substantial peak power output from tubes with low average power capacities. Its use is based on the premise that for the protection of individual targets from enemy fire control radio echo location equipments it is sufficient to generate interfering signals which will be received by these equipments only in the immediate proximity of the echo signal, so as to render impossible ascertainment of the exact position of the target object.

With this alternative method, timing circuits are required which will cause an interference pulse to be transmitted at such times that they will include echo pulses and which will maintain this synchronization regardless of changes in the enemy pulse repetition rate. Timing circuits which perform these functions, such as those described in greater detail in the copending application of Andrew V. Haeff and Franklin H. Harris, entitled: A Synchronizing System, Serial Number 641,363 filed January 15, 1946, normally will utilize each received pulse from the enemy radio location equipment to actuate an interfering pulse delayed so that it will include the next following echo pulse reflected from the target object. Synchronization is maintained by generating error signals when discrepancies arise, and using these error signals to alter the delay.

The effectiveness of these timing circuits is impaired if, because of atmospheric conditions or other reasons, one or more pulses from the enemy radio echo location equipment is not received. The aim of the present invention is to obviate this impairment.

It is accordingly one object of this invention to continue the actuating of an interfering transmitter at an established pulse repetition rate when the normal actuating signal is temporarily interrupted.

Another object of this inventuion is to provide a correction to the synchronizing circuits of an interfering transmitter when the pulse repetition rate of the enemy radio echo location equipment decreases.

A further object of this invention is to provide a means for returning control to the basic synchronizing circuits when a large change occurs in the pulse repetition rate of the enemy radio echo location equipment.

Other objects and features of the present invention will become apparent upon a careful consideration of the following detailed description when taken together with the accompanying drawings, in which.

Figure 3:
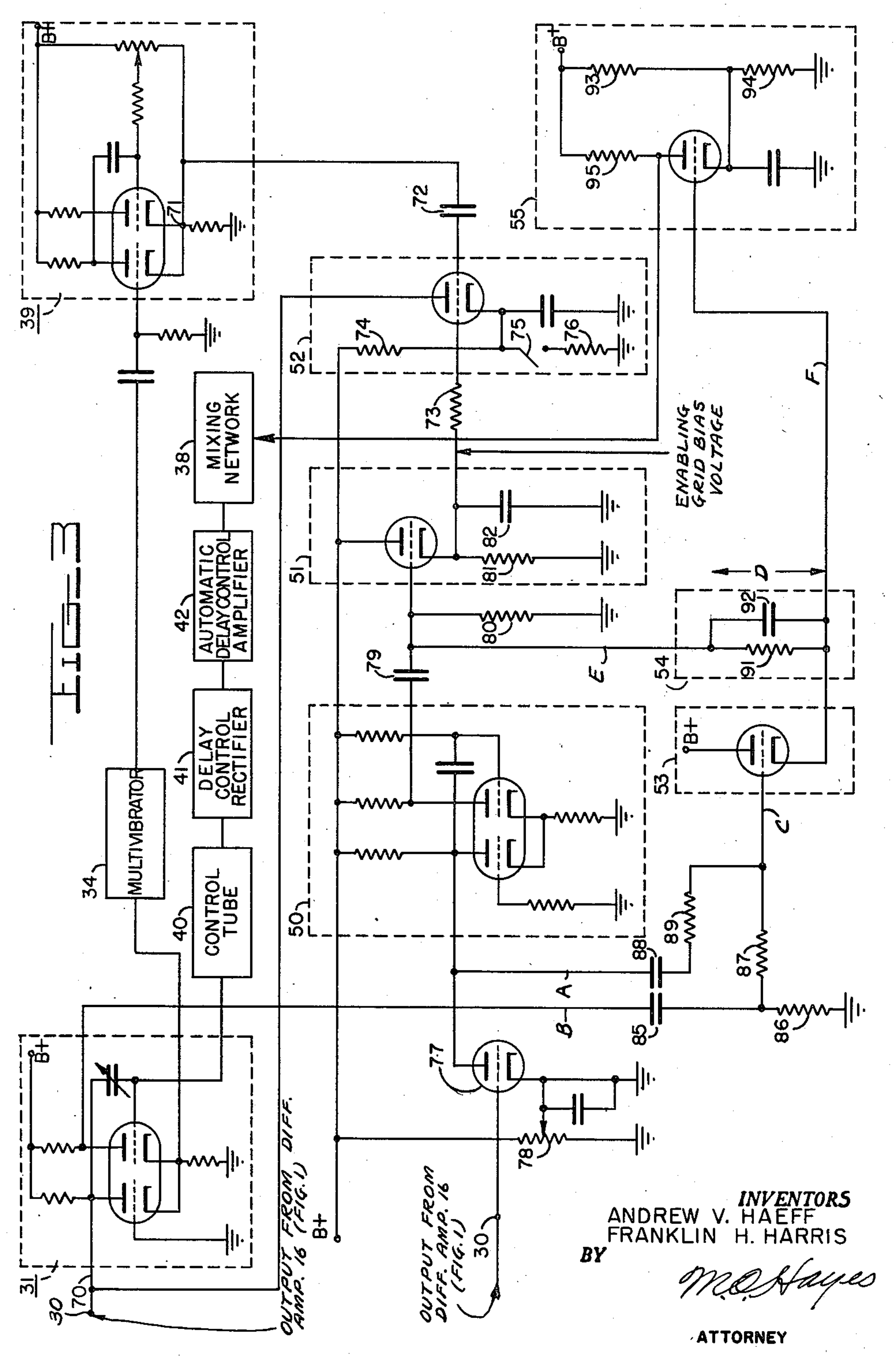
Figures 4, 5:
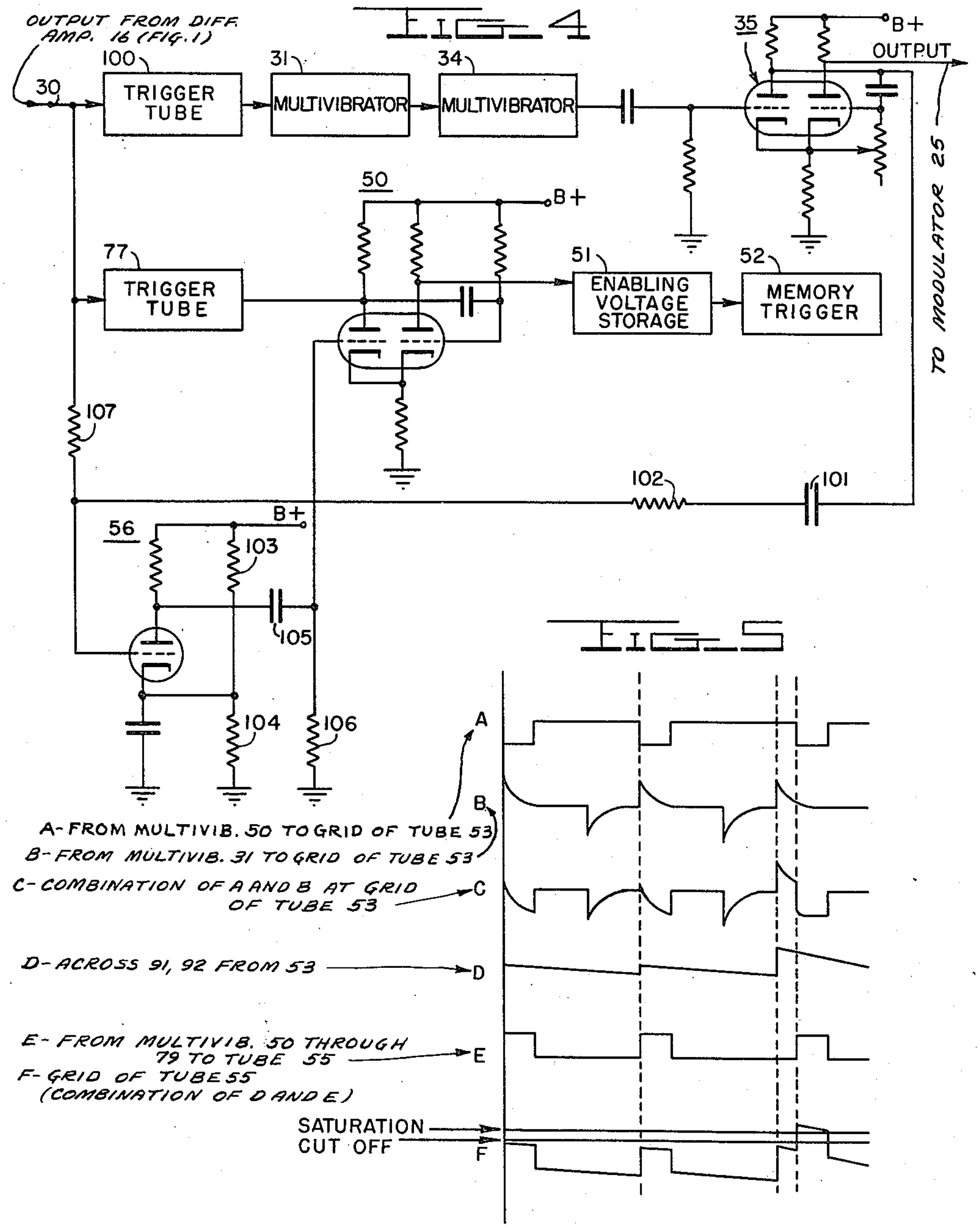

Fig. 3, partly in schematic form, shows the basic timing circuits, the circuits which continue operation during temporary interruptions of the received signals, and the circuits which provide the correction to the synchronizing circuits when the pulse repetition rate changes;

Fig. 4 is a diagram, partly schematic, of the circuits which return control to the basic synchronizing circuits when a large change occurs in the pulse repetition rate; and Fig. 5 shows a series of wave shapes useful in explaining the various circuits which provide the correction.

The interference transmitting system of which the present invention is a part, and which is described in detail in the Haeff application supra, receives radio pulses of enemy origin and utilizes them to actuate pulses after a suitable interval which in turn actuate a transmitter. In order that the output of transmitter will not reactuate the system, means are provided whereby a portion of the transmitter output neutralizes the transmitter signal received by the receiver antenna.

Figure 1:
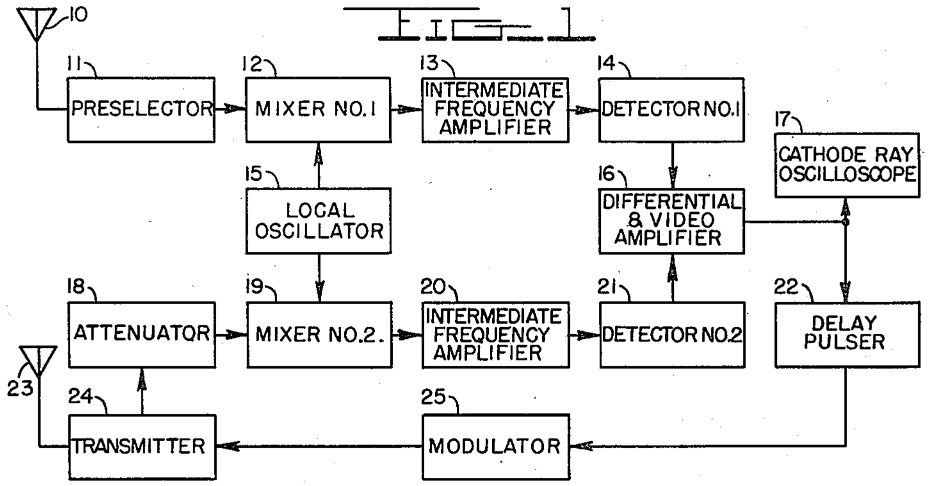
Fig. 1 is a block diagram of the interference transmitting system of which this invention is a part.

Specifically, and in accordance with the arrangement shown in Fig. 1, the pulses transmitted by the enemy radio are received by antenna 10 of a directional type, amplified by preselector 11, and converted to signals of an intermediate frequency by beating with the output of local oscillator 15 in mixer 12. These intermediate frequency signals then are amplified in intermediate frequency amplifier section 13, demodulated in detector 14, and further amplified in differential amplifier and video amplifier 16, the output of which is applied to cathode ray indicator tube 17 and to the delay pulser 22.

For each trigger pulse received from the video amplifier 16, the delay pulser 22 applies an actuating pulse to modulator 25 after a suitable delay. Modulator 25 in turn actuates transmitter 24, the output of which is radiated through a separate directional antenna 23. The delay occasioned by delay pulser 22 is such that the actuating pulse from the delay pulser overlaps the next succeeding pulse received from the enemy.

The cathode ray indicator tube 17 and its associated circuits are used in adjusting the pulser 22 to the enemy pulse repetition rate.

A small portion of the output of transmitter 24 is fed through attenuator 18 to mixer 19 where it is converted to the intermediate frequency by beating with the output of local oscillator 15. This signal is amplified in intermediate frequency amplifier section 20, demodulated in detector 21 and applied to differential amplifier 16. Differential amplifier 16 is arranged, in a manner described in the Haeff application supra, so that the signal originating in leakage radiation coupling between the receiving and transmitting antennas 10 and 23 respectively and applied from detector 14 is neutralized by the signal applied from detector 21. Accordingly, when the channel containing detector 21 is operative, only the pulses received from the enemy radar and a small residue of the interference pulses are passed to delay pulser 22 and cathode ray tube 17.

Figure 2:
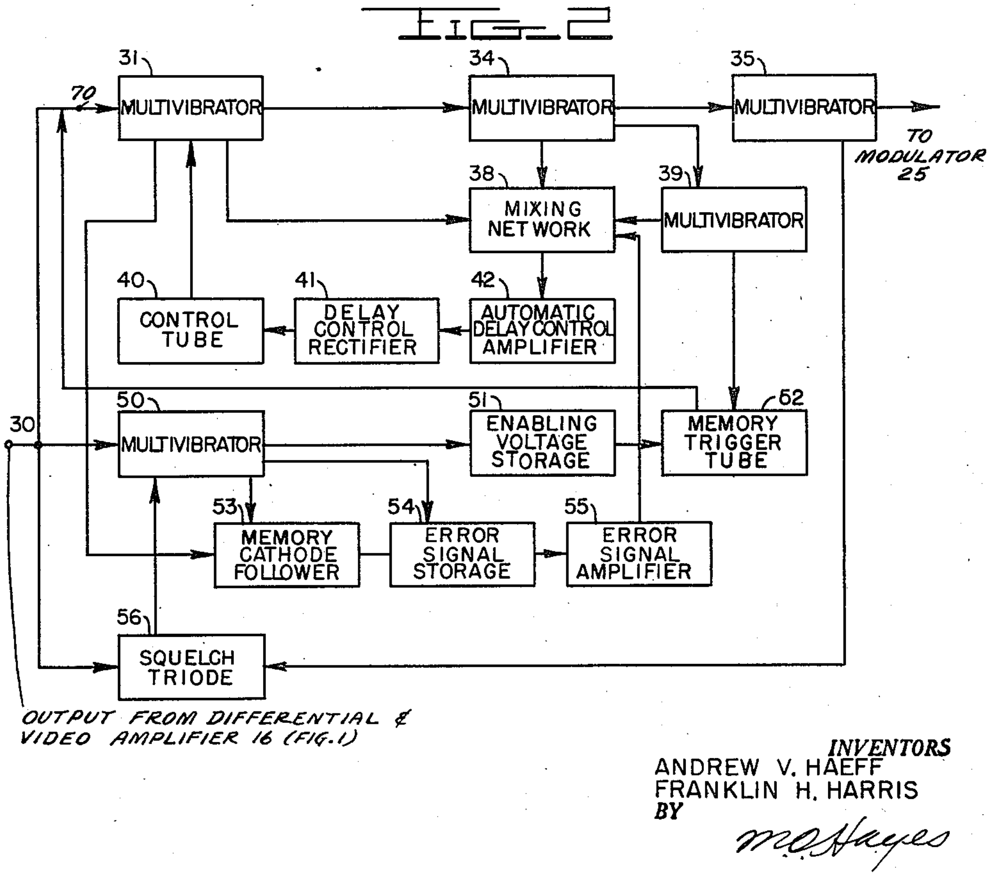
Fig. 2 is a block diagram of the basic circuits used in timing the pulses and the pertinent circuits of the invention.

The interrelation of the pertinent circuits contained in the delay pulser is shown in Fig. 2. The timing and duration of the interference pulse is determined in the channel comprising a series of timing pulse generators shown in this embodiment as multivibrators 31, 34, and 35. Multivibrator 31 is a one-shot multivibrator the period of which is controlled both mechanically (by adjusting the resistance or capacitance of the grid circuit of the normally conducting tube) and by the voltage applied from the control tube 40. Multivibrators 34 and 35 are also one-shot multivibrators the periods of which may be adjusted. Multivibrator 31 is triggered by the pulse signal received from the enemy, which is applied at input 30, and the trailing edge of the output of this multivibrator triggers multivibrator 34. The trailing edge of the output of multivibrator 34 in turn triggers multivibrator 35. The combined periods of multivibrators 31 and 34 determine the time elapsing between the reception of the first pulse from the enemy and the start of the interference pulse which is to obscure the echo from the next succeeding pulse from the enemy. Multivibrator 35 determines the duration of the interference pulse.

Multivibrator 39, which is another one-shot multivibrator with an adjustable period, is used in the automatic delay control circuits presently to be described. This multivibrator is also triggered by the trailing edge of the output from multivibrator 34. The total of the periods of multivibrators 31, 34, and 39 is made equal to the interval between pulses received from the enemy.

The timing in the system as above described would be adequate if no changes occurred in the pulse repetition rate of the enemy radio echo location equipment. For the possibility that such changes will occur, it is desirable to provide means whereby the system automatically adjusts itself to such changes. The mixing network 38, automatic delay control amplifier 42, the delay control rectifier 41 and the control tube 40 perform this function. Positive pulses of equal amplitude are applied from multivibrators 31, 34, and 39 to mixing network 38. Since the combined periods of these three multivibrators are equal to the interval between enemy pulses at the initial pulse repetition frequency, the output of the mixing network is a steady direct current voltage as long as the enemy pulse repetition frequency remains constant. If, however, the enemy pulse repetition frequency is increased, part of the output of multivibrator 39 will overlap the start of the positive pulse from multivibrator 31, and positive pulses will appear in the output of mixing network 38. Similarly, if the enemy pulse repetition rate is decreased, negative pulses will appear in the output of the mixing network. The automatic delay control rectifier 41 operates to convert these positive or negative pulses into steady signals which are applied to the grid of delay control tube 40.

The period of multivibrator 31 (see Fig. 3) is determined in part by the potential to which the grid of its normally conducting tube is returned. This potential is determined by the delay control tube in such a way that the period of multivibrator 31 is decreased if positive pulses are applied to automatic delay control amplifier 42 and, conversely, is increased if negative pulses are applied to automatic delay control amplifier 42. This action tends to keep the system synchronized with the enemy pulse repetition rate.

The timing and synchronizing system which has been described above, and which is described in greater detail in the Haeff and Harris application supra, will be adequate provided there is no interruption, due to atmospheric or other conditions, in the reception of signals from the enemy radio echo location equipment. When such interruptions do occur, as has been mentioned previously, the effectiveness of the system will be impaired. The circuits represented by the remaining blocks in the Fig. 2 circuit representation are to prevent this impairment.

If the pulse repetition rate of the enemy equipment remains the same, and if adequate reception of signals from the enemy is somehow interrupted, it is necessary that the system continue to be triggered at the proper intervals during the interruption. The trailing edge of the output from multivibrator 39 coincides in time with the reception of the next succeeding signal from the enemy for the established pulse repetition rate. Consequently, the trailing edge of the output from multivibrator 39 is used to actuate the memory trigger tube 52 which in turn applies the required trigger pulse to the input of multivibrator 31.

It is necessary that the memory trigger tube 52 be operative only for a short interval after signals from the enemy equipment cease entirely; otherwise, the memory feed back channel would continue the system in operation for an indefinite period. Consequently, memory trigger tube 52 must be supplied with an enabling voltage which is present only while and immediately after the enemy equipment is in operation. Multivibrator 50 is a one shot multivibrator triggered by the signals received from the enemy at input 30. The output pulses from multivibrator 50 are filtered in the enabling voltage holding circuit 51 to provide the required enabling voltage for memory trigger circuit 52.

If, while the memory circuit is in operation, the enemy pulse repetition rate is increased, the automatic delay control circuits will operate in the normal manner to return the system to synchronization, since the next received signal from the enemy will trigger multivibrator 31 before the memory trigger pulse from memory trigger tube 52 is generated. When the memory trigger pulse is generated, it will be applied to multivibrator 31 at a time in the cycle of the latter when it will have no effect.

If, however, the enemy pulse repetition rate decreases while the memory circuit is in operation, the memory circuit, as described above, would trigger the system before the next succeeding signal from the enemy was received, and accordingly, the automatic delay control circuits would be prevented from maintaining synchronization. Consequently, when this situation arises, error signals must be applied to the mixing network 38 from some adjunct of the memory circuit itself. Moreover, the adjunct must distinguish between enemy signals arriving late and enemy signals not arriving at all. Multivibrator 31 which is activated by either the enemy signal or the memory circuit, and multivibrator 50 which is activated by the enemy signal only, both apply signals to the memory cathode follower 53. If these signals coincide, no error signal is generated; however, if the signal from multivibrator 31 arrives first, an error signal is generated which is stored in a capacitor resistor network 54 having a suitable time-constant. Then, if the enemy signal only is late, when this signal is received, the output from multivibrator 50 applies the error signal remaining in the storage network 54 to the error signal amplifier 55. From the error signal amplifier 55 it is applied as a negative pulse to the mixing network 38, actuating the automatic delay control circuits. If, however, no enemy signal corresponding to the cycle under consideration arrives, the stored error signal expires according to the time-constant characteristics of network 54, and the memory circuits operate normally without actuating the automatic delay control.

It has been found that with the memory circuits in operation, the synchronizing circuits are not as responsive to sudden changes in the enemy pulse repetition rate as they are without the memory circuits in operation. In particular, if the enemy pulse repetition rate is switched to a significantly different value, there is the possibility that the system will stabilize itself in such a way that only some submultiple of the enemy pulses is covered. For this possibility, means are provided to disable the memory circuits when enemy signals are not being covered by the interfering pulses. A signal corresponding to the interfering pulse from multivibrator 35 and the signal received from the enemy are both applied to squelch triode 56. If the latter signal occurs during the interval of the former, there is no output from the squelch triode 56. If, however, an enemy signal does not occur during the interval of the former, it causes the squelch triode 56 to apply a short pulse to multivibrator 50. This short pulse applied to multivibrator 50 prevents this multivibrator from being actuated by the enemy signals. When multivibrator 50 is not actuated, the enabling voltage holding circuit 51 does not provide the enabling voltage to the memory circuit. Accordingly, the memory circuits are rendered inoperative and the adjustment in the timing is made directly by the automatic delay control circuits.

For a more detailed description of the memory circuit and some of its associated circuits, reference is now made to Fig. 3. Multivibrator 31 is triggered by means of a trigger tube, not shown, the signal from which is applied at terminal 70. The trailing edge of the output from multivibrator 31 in turn triggers multivibrator 34, and the trailing edge of the output from multivibrator 34 triggers multivibrator 39. A negative pulse is obtained from the cathode terminals 71 of this one shot cathode coupled multivibrator, which pulse is differentiated by capacitor 72 and resistor 73 for application to the grid of the memory trigger tube 52.

Switch 75 determines whether or not the memory circuits are to be operative. When switch 75 is open, the cathode of memory trigger tube 52 is returned to the positive side of the power supply, and the tube remains non-conducting regardless of signals applied to the grid. When switch 75 is closed, the cathode potential is determined by the voltage divider comprising resistor 74 and resistor 76. The potential determined by this voltage divider is sufficient to hold the tube cut off in spite of signals applied to its grid from the differentiated output of multivibrator 39, unless a positive grid bias is obtained from the enabling voltage holding cathode follower 51. If a positive grid bias is obtained from the enabling voltage holding cathode follower 51, the short positive pulse occassioned in the differentiator circuit by the trailing edge of the output of multivibrator 39 causes memory trigger tube 52 to be momentarily conducting. Memory trigger tube 52 has a common plate load resistor with the normally non-conducting tube of multivibrator 31. Accordingly, when the former tube is rendered conducting, multivibrator 31 is actuated according to well known multivibrator principles, and the system is maintained in operation even if for some reason the signal expected from the enemy radio echo location equipment is not received.

The enabling voltage holding cathode follower 51 maintains an enabling grid bias for the memory trigger tube for an interval long enough to permit the memory channel to operate through short interruptions in the reception of enemy signals, but not to operate indefinitely. This cathode follower is actuated by multivibrator 50 which is in turn actuated by trigger tube 77. Signal pulses of positive polarity received from the enemy radio echo location equipment are applied to the grid of trigger tube 77. The cathode potential and thus the threshold sensitivity of tube 77 is determined by the position of the tap on potentiometer 78. Tube 77 has the same plate load resistor as the normally non-conducting tube of multivibrator 50; consequently, this multivibrator is actuated when tube 77 is rendered conducting by the enemy signals.

A positive pulse is taken from the plate of the normally conducting tube of multivibrator 50 and applied through a coupling network comprising capacitor 79 and resistor 80 to the grid of enabling voltage holding cathode follower 51. The load of this cathode follower, comprising resistor 81 and capacitor 82 in shunt, filters the positive pulse output, and a suitable direct current voltage is applied as bias from the cathode of tube 51 to the grid of memory trigger tube 52. The period for which this bias is retained after enemy signals are no longer received is determined by the time constant of the circuit comprising resistor 81 and capacitor 82.

In order to generate an error signal for application to the automatic delay control circuits when the enemy pulse repetition rate decreases, two signals are applied to the memory cathode follower 53.

A negative pulse is obtained from the normally non-conducting tube of multivibrator 50 and applied through capacitor 88 and resistor 89 to the grid of tube 53. This signal is shown as waveform A on Fig. 5 and its leading edge coincides with the reception of the enemy signal. Also, a positive pulse is obtained from the plate of the normally conducting tube of multivibrator 31, is differentiated by capacitor 85 and resistor 86, and is applied through resistor 87 to the grid of tube 53. This signal is shown as waveform B on Figure 5, and the leading edge of the positive pulse corresponds to the time of triggering the system, either by the enemy signal or by the memory circuit.

The combination of these two signals is shown as waveform C in Fig. 5. When the system is properly synchronized, the two leading edges coincide (as is shown in the first two cycles of waveform C), and no significant positive signal is applied to the grid of tube 53. If, however, the enemy signal is delayed or is not received, the positive pulse occasioned by the leading edge of the output from multivibrator 31 does appear as a positive signal (as is shown in the third cycle of waveform C).

The cathode of tube 53 is connected to ground through resistor 91 and resistor 80. Resistor 91 is a large resistor; consequently, in the quiescent condition very little current flows through the tube. When a positive signal such as that shown for the third cycle of waveform C is applied to the grid of tube 53, a substantial increase in current occurs and capacitor 92 charges according to a relatively short time constant. At the termination of this signal, the voltage developed across capacitor 92 is sufficient to cut tube 53 off; consequently the capacitor discharges according to a much larger time constant. The voltage at the cathode of tube 53 (the high potential side of the storage network comprising resistor 91 and capacitor 92) is shown as waveform D on Fig. 5. The higher voltage observed for the third cycle is, in effect, the error signal, and it is applied as enabling bias to the grid of the error signal amplifier tube 55.

A positive pulse is obtained from the plate of the normally conducting tube of multivibrator 50 if and when the enemy signal arrives. This pulse, which is shown as waveform E on Fig. 5, is applied through capacitor 79 and the storage network to the grid of tube 55 also. The composite signal on the grid of tube 55 is shown as waveform F on Fig. 5.

The cathode of tube 55 is maintained at a potential determined by the voltage divider comprising resistors 93 and 94. As will be apparent from Fig. 5 F this potential is such that tube 55 is held cut off except when the stored error signal and the pulse from multivibrator 50 operate in combination to raise the potential of the grid. Thus the tube is not rendered conducting if the enemy signal is received when it is expected and is not rendered conducting if the enemy signal is not received at all, but is rendered conducting if the enemy signal is received late.

When tube 55 conducts, a negative pulse is obtained from its plate and applied to the mixing network 38 which actuates the automatic delay control circuits in the manner described in the Haeff and Harris application supra.

For a more detailed description of the circuits which return control to the automatic delay control circuits when the interfering pulse is found to be not covering the echo signal effectively, reference is now made to Fig. 4.

Short positive pulses coincident with the reception of enemy signals are applied from input 30 to the grid of the squelch tube 56. Negative pulses are also applied to this grid from the normally non-conducting tube of multivibrator 35 through capacitor 101 and resistor 102. The latter negative pulses coincide in time with the interference pulses; consequently, when the enemy signals are being properly included the positive pulses from input 30 occur within the negative pulses from multivibrator 35.

The cathode potential of tube 56 is determined by the voltage divider comprising resistors 103 and 104. This potential is such that the tube remains cut off while no signal is applied to its grid and while the positive pulses from input 30 are offset by the negative pulses from multivibrator 35. If, however, the received signals are not properly included, the two signals to the grid of tube 56 arrive separately; and the positive pulses from input 30 render the tube conducting.

When tube 56 conducts, a negative pulse is applied from its plate through the coupling network comprising capacitor 105 and resistor 106 to the grid of the normally nonconducting tube of multivibrator 50. This pulse arrives simultaneously with the trigger signal from trigger tube 77 and prevents the multivibrator from being actuated. When the multivibrator is not actuated, the enabling voltage holding cathode follower does not maintain an enabling voltage for the memory trigger tube 52; and, accordingly the memory channel is inoperative. With the memory channel inoperative, the automatic delay control circuits assume full control of the timing.

Although only a certain and specific embodiment of the invention has been shown and described, we are fully aware of the many modifications thereof. Therefore this invention is not to be limited except insofar as is necessitated by the spirit of the prior art and the scope of the claims.

In the appended claims the words "received pulse" are construed to mean any pertinent actuating signal, and the words "transmitted pulse" are construed to mean any pertinent output signal.

The invention described herein may be manufactured and used by or for the Government of the United States of America for governmental purposes without the payment of any royalties thereon or therefor.

What is claimed is:

1. A method of recurrently transmitting pulses in dependency on a series of recurrent received pulses comprising the steps of receiving the recurrent pulses, initiating a timing period on receipt of a pulse, terminating the timing period before the receipt of the next pulse, transmitting a pulse signal responsively to the termination of the timing period, recurrently generating a series of timing pulses at the average recurrence period of a preceding number of received pulses following each received pulse by the same timing period, and initiating transmission of a periodic pulse in response to a timing pulse in the event of failure to receive a recurrent pulse.

2. Apparatus for receiving periodic pulses and transmitting other periodic pulses in response to the received pulses comprising time delay means becoming operative responsively to a received pulse, pulse transmitter means initiated into operation after a time delay by the delay means, timing pulse generator means operative to supply timing pulses at the average recurrence rate of a preceding number of received periodic pulses, and means responsive to the timing pulse generator means operative to initiate operation of the time delay means in the event of brief interruption in the reception of periodic pulses.

3. Apparatus for receiving periodic pulses and transmitting other periodic pulses in response to the received pulses comprising time delay means operative responsively to a received pulse, pulse transmitter means initiated into operation after a time delay by the delay means, pulse generating means initiated into operation by the output of the delay means, the pulse generating means and the delay means in combination establishing the expected interval between successive received pulses; and means responsive to the trailing edge of the output of the pulse generating means which reinitiates operation of the time delay means.

4. Apparatus for receiving periodic pulses and transmitting other periodic pulses in response to the received pulses comprising time delay means operative responsively to a received pulse, pulse transmitter means initiated into operation after a time delay by the delay means, a first pulse generating means initiated into operation by the received pulses; means converting the output of the first pulse generator means into a direct current enabling voltage; capacitor means retaining the enabling voltage for a holding interval; a second pulse generating means initiated into operation by the delay means, the second pulse generating means and the delay means in combination establishing the expected interval between successive received pulses; and means reinitiating the delay means into operation from the trailing edge of the output of the second pulse generating means, the reinitiating means being rendered operative by the enabling voltage.

5. Apparatus for receiving periodic pulses and transmitting other periodic pulses in response to the received pulses comprising, time delay means operative responsively to a received pulse; pulse transmitter means initiated into operation after a time delay by the delay means; a first one shot multivibrator initiated into operation by the received pulses; rectifier means converting the output of the first one shot multivibrator into a direct current enabling voltage; capacitor means retaining said enabling voltage for a holding interval; a second one shot multivibrator initiated into operation by the output of the delay means, the second one shot multivibrator and the delay means in combination establishing the expected interval between successive received pulses; vacuum tube means connected to the capacitor means operative in response to the enabling voltage to reinitiate operation of the delay means in coincidence with the trailing edge of the output of the second one shot multivibrator, the vacuum tube means being rendered capable of operation by the enabling voltage.

6. A method of generating an error signal when the repetition rate of a first series of periodic pulses decreases but not when pulses of the first series of pulses are omitted, which comprises the steps of generating separately second periodic pulses which are initially coincident with the first pulses, of polarity opposite to that of the first pulses, and initially at the recurrence rate of a preceding number of the first pulses; and generating an output error signal when pulses of the first and second series both occur but not simultaneously.

7. A method of generating an error signal when the repetition rate of a first pulsed signal decreases but not when pulses of this first pulsed signal are omitted, which comprises the steps of generating separately a second pulsed signal which is initially coincident with the first signal, of polarity opposite to that of the first signal, and having the initial repetition rate of the first signal; mixing the first signal and the second signal to neutralize the signals when corresponding pulses of both signals occur simultaneously and to form a third signal when a pulse of the first signal occurs later than the corresponding pulse of the second signal or does not occur; storing the third signal for a suitable period; and applying the third signal as an error signal if and when a pulse of the first pulsed signal occurs within that period.

8. A means for obtaining error signals when the repetition rate of a first pulsed signal decreases but not when random pulses of this first signal are omitted, which comprises; means generating a second pulsed signal initially coincident with the first pulsed signal, said second signal being of polarity opposite to that of the first signal and having the initial repetition rate of the first signal; means mixing the first signal and the second signal to neutralize the second signal when corresponding pulses of both signals occur simultaneously and to form a third signal when a pulse of the first signal occurs later than the corresponding pulse of the second signal or does not occur; means storing the signal for a suitable interval; and means applying the third signal as an error signal if and when a pulse of the first signal occurs within the interval.

9. A means for obtaining error signals when the repetition rate of a negative pulsed signal decreases but not when random pulses of this negative signal are omitted, which comprises; means generating separately a positive pulsed signal which is initially coincident with and has the initial repetition rate of the negative signal; mixing means combining the two signals; a capacitor connected with the mixing means to have its charge increased when a positive pulse is not neutralized by a negative pulse, said capacitor being arranged to retain a substantial part of the increase in charge for a finite period after the termination of the positive pulse occasioning the increase in charge; means directly responsive to each negative pulse generating a simultaneous positive pulse; and a vacuum tube amplifier having a tube with anode, cathode and grid electrodes, the grid bias of the vacuum tube amplifier being determined by the voltage across the capacitor, the grid of the vacuum tube amplifier receiving the simultaneous positive pulses, the cathode potential of the vacuum tube amplifier holding the amplifier cut off except when the simultaneous positive pulses are applied while the capacitor is suitably charged, the error signal being obtained from the output of the amplifier.

10. Apparatus for receiving periodic pulses and transmitting other periodic pulses in response to the received pulses so that each transmitted pulse includes in time the next succeeding received pulse and so that the transmission of pulses continues through brief interruptions in the received pulses, which comprises; time delay means operative responsively to a received pulse; pulse transmitter means initiated into operation after a time delay by the delay means; pulse generator means operative to supply timing pulses at the average recurrence rate of a preceding number of received periodic pulses; means responsive to the timing pulses operative to initiate operation of the time delay means in the event of brief interruption in the reception of the periodic pulses; means generating a first pulsed control signal responsively to the trailing edges of the timing pulse; means generating a second pulsed control signal responsively to the received pulses, said second signal being of polarity opposite to that of said first signal; means mixing the first signal and the second signal to effectively neutralize the first signal when corresponding pulses of both signals occur simultaneously and to form a third signal when a pulse of the second signal occurs later than the corresponding pulse of the first signal or does not occur; means storing the third signal for a suitable interval; means applying the third signal as an error signal if and when a pulse of the second signal occurs within the interval; and circuit means operative responsively to the error signal to adjust the time delay means to maintain synchronization.

11. Apparatus for receiving periodic pulses and transmitting other periodic pulses in response to the received pulses so that each transmitted pulse includes in time the next succeeding received pulse and so that the transmission of pulses continues through brief interruptions in the received pulses, which comprises; time delay means operative responsively to a received pulse; pulse transmitter means initiated into operation after a time delay by the delay means; pulse generator means operative to supply timing pulses at the average recurrence rate of a preceding number of received periodic pulses; means responsive to the timing pulses operative to reinitiate operation of the time delay means in the event of brief interruption in the reception of the periodic pulses; means generating a positive pulsed control signal with leading edges coincident with the trailing edges of the timing pulses; means generating a negative pulse control signal responsively to the received pulses; mixing means combining the two control signals; a capacitor connected with the mixing means to have its charge increased when a positive pulse is not neutralized by a negative pulse, said capacitor being arranged to retain a substantial part of the increase in charge for a finite period after the termination of the positive pulse occasioning the increase in charge; means directly responsive to each negative pulse generating a simultaneous positive pulse; a vacuum tube amplifier having a tube with anode, cathode and grid electrodes, the grid bias of the amplifier being determined by the voltage across the capacitor, the grid of the amplifier receiving the simultaneous positive pulses, the cathode potential of the amplifier holding the amplifier cut off except when the simultaneous positive pulses are applied while the capacitor is suitably charged; and circuit means responsive to the output of the amplifier adjusting the time delay means to maintain synchronization.

12. Apparatus for receiving periodic pulses and transmitting other periodic pulses in response to the received pulses so that each transmitted pulse includes in time the next succeeding received pulse and so that the transmission of pulses normally continues through brief interruptions in the received pulses, which comprises time delay means operative responsively to received pulses; pulse transmitter means initiated into operation after a time delay by the delay means; control circuit means operative to generate error signals when the recurrence rate of the received pulses changes; means responsive to the error signals to adjust the time delay means to restore synchronization; means generating an enabling voltage responsively to the received signals; means rendered operative by the enabling voltage for reinitiating into operation the time delay means in the event of interruptions in the received pulses; means generating negative pulses coincident with the transmitted pulses; means mixing said negative pulses with the received pulses in positive polarity; and an amplifier receiving the output of said mixing means, said amplifier being responsive only when the received pulses do not occur within the interval occupied by the negative pulses, the output of the amplifier rendering the enabling voltage generating means inoperative.

13. A system for transmitting pulses in a selected time relationship to received recurrent pulses comprising, a receiver system operative to receive and amplify recurrent pulse signals, a delay pulse generator connected to the output of said receiver system operative to provide transmitter keying signals each bearing a selected time displacement from each received pulse signal, signal sustaining means operative to initiate operation of the delay pulse generator to sustain production of transmitter keying signals upon momentary interruption of received signals, and transmitter means operative to transmit an output pulse responsive to each transmitter keying signal.

ANDREW V. HAEFF.
FRANKLIN H. HARRIS.

REFERENCES CITED

The following references are of record in the file of this patent:

UNITED STATES PATENTS

| Number | Name | Date |
|---|---|---|
| 2,266,401 | Reeves | Dec. 16, 1941 |
| 2,272,070 | Reeves | Feb. 3, 1942 |
| 2,402,916 | Schroeder | June 25, 1946 |
| 2,402,917 | Miller | June 25, 1946 |
| 2,413,932 | Sziklai | Jan. 7, 1947 |
| 2,415,359 | Loughlin | Feb. 4, 1947 |
| 2,418,127 | Labin | Apr. 1, 1947 |
| 2,419,548 | Grieg | Apr. 29, 1947 |